US011159454B2

(12) United States Patent
Bernat et al.

(10) Patent No.: US 11,159,454 B2
(45) Date of Patent: *Oct. 26, 2021

(54) TECHNOLOGIES FOR ACCELERATING EDGE DEVICE WORKLOADS

(71) Applicant: Intel Corporation, Santa Clara, CA (US)

(72) Inventors: Francesc Guim Bernat, Barcelona (ES); Anil Rao, Menlo Park, CA (US); Suraj Prabhakaran, Aachen (DE); Mohan Kumar, Aloha, OR (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,232

(22) Filed: Jan. 21, 2020

(65) Prior Publication Data

US 2020/0396177 A1 Dec. 17, 2020

Related U.S. Application Data

(63) Continuation of application No. 15/941,943, filed on Mar. 30, 2018, now Pat. No. 10,541,942.

(51) Int. Cl.
*H04L 12/947* (2013.01)
*H04L 12/66* (2006.01)
(Continued)

(52) U.S. Cl.
CPC .............. *H04L 49/25* (2013.01); *H04L 12/66* (2013.01); *H04L 41/0823* (2013.01);
(Continued)

(58) Field of Classification Search
CPC ......... H04L 49/25; H04L 12/66; H04L 47/33; H04L 49/205; H04L 41/5019; H04L 41/0823
See application file for complete search history.

(56) References Cited

U.S. PATENT DOCUMENTS 10,110,495 B1 10/2018 Sabella et al.
10,244,071 B2 3/2019 Moustafa et al.
(Continued)

OTHER PUBLICATIONS

Intel, "Intel Network Builders Program Goes to the 'Edge,'" White Paper, 4 pages.
(Continued)

*Primary Examiner* — Ajay Cattungal
(74) *Attorney, Agent, or Firm* — Hanley, Flight & Zimmerman, LLC

(57) ABSTRACT

Technologies for accelerating edge device workloads at a device edge network include a network computing device which includes a processor platform that includes at least one processor which supports a plurality of non-accelerated function-as-a-service (FaaS) operations and an accelerated platform that includes at least one accelerator which supports a plurality of accelerated FaaS (AFaaS) operation. The network computing device is configured to receive a request to perform a FaaS operation, determine whether the received request indicates that an AFaaS operation is to be performed on the received request, and identify compute requirements for the AFaaS operation to be performed. The network computing device is further configured to select an accelerator platform to perform the identified AFaaS operation and forward the received request to the selected accelerator platform to perform the identified AFaaS operation. Other embodiments are described and claimed.

20 Claims, 5 Drawing Sheets

(51) Int. Cl.
*H04L 12/801* (2013.01)
*H04L 12/931* (2013.01)
*H04L 12/24* (2006.01)

(52) U.S. Cl.
CPC .......... *H04L 41/5019* (2013.01); *H04L 47/33* (2013.01); *H04L 49/205* (2013.01)

(56) References Cited

U.S. PATENT DOCUMENTS

| | | |
|---|---|---|
| 10,440,096 B2 | 10/2019 | Sabella et al. |
| 10,541,942 B2 | 1/2020 | Bernat et al. |
| 2017/0251368 A1 | 8/2017 | Ross et al. |
| 2018/0034924 A1* | 2/2018 | Horwood ................ H04L 67/16 |
| 2019/0012218 A1* | 1/2019 | Rimae ..................... G06F 9/542 |
| 2019/0014171 A1* | 1/2019 | Stein ....................... G06F 9/542 |
| 2019/0028552 A1* | 1/2019 | Johnson, II ............. H04L 67/02 |
| 2019/0042955 A1* | 2/2019 | Cahill ..................... G06N 5/04 |
| 2019/0104182 A1* | 4/2019 | Elzur ................... H04L 41/5025 |
| 2019/0108259 A1* | 4/2019 | Rabbah ................ G06F 9/5077 |
| 2019/0181911 A1* | 6/2019 | Schulz .................. H04M 9/082 |

OTHER PUBLICATIONS

United States Patent and Trademark Office, "Notice of Allowance," mailed in connection with U.S. Appl. No. 15/941,943, dated Sep. 9, 2019, 10 pages.

* cited by examiner

TECHNOLOGIES FOR ACCELERATING EDGE DEVICE WORKLOADS

CROSS-REFERENCE TO RELATED APPLICATION

The present application is a continuation application of U.S. application Ser. No. 15/941,943, entitled "TECHNOLOGIES FOR ACCELERATING EDGE DEVICE WORKLOADS," which was filed on Mar. 30, 2018 and which issued on Jan. 21, 2020 as U.S. Pat. No. 10,541,942.

BACKGROUND

Mobile computing devices, vehicles, appliances, industrial equipment, and other types of Internet-enabled devices are becoming seemingly ubiquitous. Such devices typically offload computational workload so as to preserve power and/or compute resources, typically also depending on wireless communications which are latency sensitive to transfer collected information from and receive computational result information to the devices. While modern computing systems continue to trend toward cloud-based servers performing the necessary computations/storage and a wireless network infrastructure to facilitate the transfer of data, there can be undesirable latencies associated with such an approach. As such, more computation supporting devices have moved out of/away from the cloud and closer to the primary devices themselves.

Such edge architectures leverage servers, applications, and small clouds (e.g., cloudlets) at the edge of the traditional network in order to perform data processing nearer to the source of the data. For example, multi-access edge computing (MEC) is one such edge network architecture that enables cloud computing capabilities at the edge of a cellular network, which provides a highly distributed computing environment that can be used to deploy applications and services as well as to store and process content in close proximity to mobile users. However, physical space restrictions can often limit the amount of compute and storage which can be made available at the edge device, potentially inhibiting scale.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
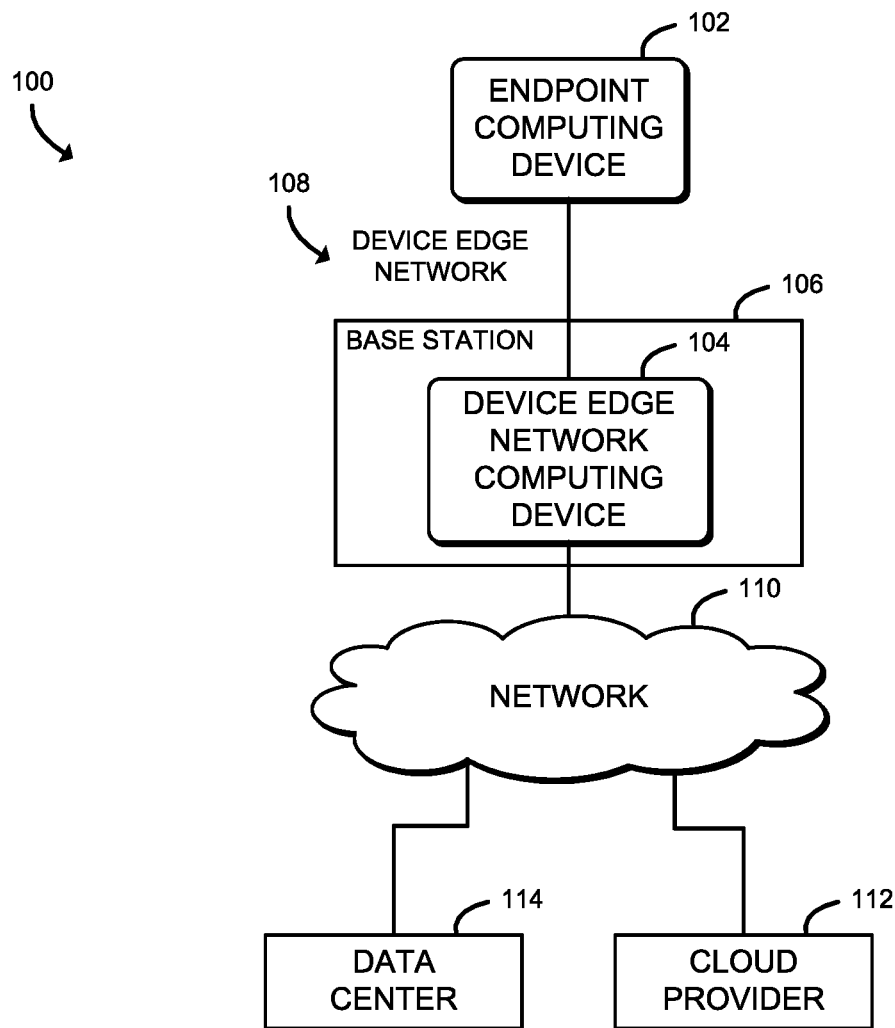
FIG. 1 is a simplified block diagram of at least one embodiment of a system for accelerating edge device workloads.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for accelerating edge device workloads includes an endpoint computing device 102 communicatively coupled to a device edge network computing device 104 forming a device edge network 108. While illustratively shown as having a single endpoint computing device 102 communicatively coupled to the device edge network computing device 104, it should be appreciated that the system 100 may include multiple endpoint computing device 102, in other embodiments. Similarly, it should be appreciated that, in other embodiments, the system 100 may include multiple device edge network computing devices 104, each having multiple endpoint computing device 102 being communicatively connected thereto, in other embodiments.

In use, a software application running on an endpoint computing device 102 has data that has been collected, generated, or otherwise obtained upon which some compute functionality is to be performed thereon. However, as will be described in further detail below, the endpoint computing device 102 may not be the optimal device to perform the necessary compute operation(s). For example, this may be attributable to a lack of sufficient compute power, battery power, and/or storage space available on the endpoint computing device 102, a need to leverage additional/externally sourced information, and/or simply that the compute operation(s) are not supported by the platform (i.e., the hardware/software resources) of the endpoint computing device 102.

In an illustrative embodiment in which the endpoint computing device 102 is embodied as an Internet of Things (IoT) device with an image sensor, there may be a need to perform an image analysis on one or more images captured by the endpoint computing device 102. However, in furtherance of the illustrative embodiment, the endpoint computing device 102 may lack sufficient source power and/or compute capacity, may not be an optimal usage of the available resource, and/or may not have been configured (i.e., programmed to include the necessary code) to perform the image analysis. In other words, for any number of reasons, the endpoint computing device 102 is configured to offload at least a portion of the data to the device edge network computing device 104 such that compute operation(s) may be performed externally and a result of the compute operation(s) returned to the endpoint computing device 102.

Accordingly, in use, as will be described in further detail below, the device edge network computing device 104 is configured to expose low-latency function-as-a-service (FaaS) and accelerated FaaS (AFaaS) to accelerate the applications/workloads running on the endpoint computing device 102. To do so, the device edge network computing device 104 includes integrated accelerators (e.g., field programmable gate arrays (FPGAs)) and compute processors (e.g., Intel® Xeon processors). Additionally, the device edge network computing device 104 exposes a defined set of extensions and protocols in order to provide direct access to the endpoint computing device 102 without any system software intervention. In other words, the device edge network computing device 104 exposes interfaces to the endpoint computing device 102 which are usable to discover and execute the FaaS/AFaaS directly on the device edge network computing device 104. Further, the device edge network computing device 104 is configured to gateway, client interface, and switch functionality configured to perform the functions described herein, including performing automatic load balancing (e.g., via the gateway functionality) for requests received from the endpoint computing device 102. Also, the device edge network computing device 104 includes various platforms and accelerators which have a direct connection to the gateway via Acceleration Interface Logic (AILs), such that the gateway of the device edge network computing device 104 can send pointers to local memory to the accelerators/slave storing the requests that need to be processed and vice-versa with results.

It should be appreciated that, in some embodiments, at least a portion of the data transmitted to the device edge network computing device 104 and/or at least a portion of the result of the offloaded compute operation(s) may be forwarded to other compute and/or storage devices for which additional compute operation(s) may be executed thereon and/or storage thereof may be managed. Accordingly, as also illustratively shown, the system 100 additionally includes a data center 114 and a cloud provider 112 communicatively coupled to the device edge network computing device 104, via the network 110. The network 110 may include a backhaul and/or core network which allows access to the Internet. As such, the network 110 may be embodied as any number of various wired and/or wireless networks. For example, the network 110 may be embodied as, or otherwise include, a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. As such, the network 110 may include any number of additional devices, such as additional computers, routers, and switches, to facilitate communications among the devices of the system 100.

Figure 2:
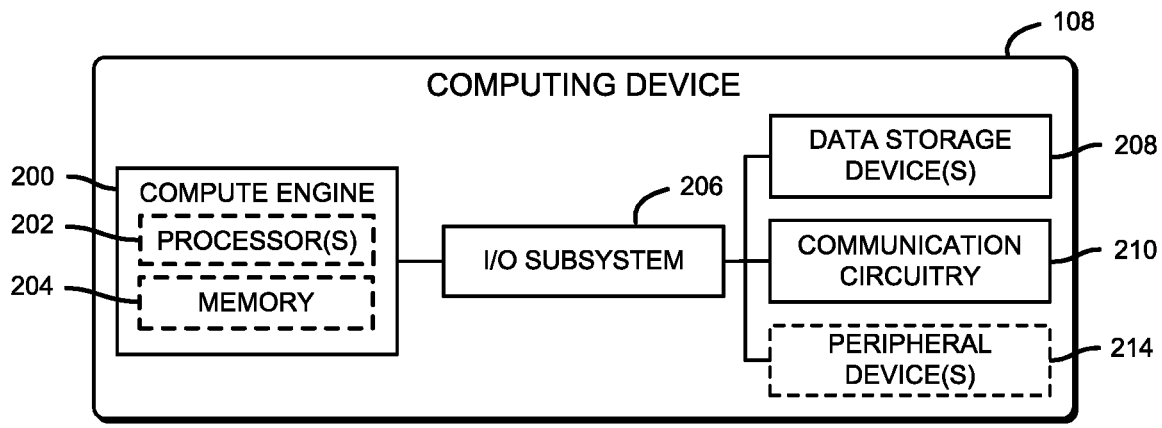
FIG. 2 is a simplified block diagram of at least one embodiment of the endpoint computing device of the system of FIG. 1.

Depending on the embodiment, the device edge network computing device 104 may be communicatively coupled to the data center 114, the cloud provider 112, and/or another provider, such as a mobile network operator (i.e., wireless service provider/carrier). Accordingly, depending on the embodiment, the device edge network computing device 104 may be housed in a base station (e.g., the illustrative base station 106), a small cell, etc., which may be owned and/or operated by the mobile network operator. Further, the data center 114 and/or the cloud provider 112 may perform backend compute/storage services as a function of the connectivity provided by the mobile network operator. It should be appreciated that The endpoint computing device 102 may be embodied as any type of connected device with limited computing resources and/or limited available power. For example, the endpoint computing device 102 may be embodied as, without limitation, a mobile computing device (e.g., a smartphone, a tablet computer, a laptop computer, a notebook computer, a wearable device), an IoT gateway, an embedded device, or any other type of device reliant on low latency operations to be performed at the device edge network 108. Referring now to FIG. 2, the illustrative endpoint computing device 102 includes a compute engine 200, an I/O subsystem 206, one or more data storage devices 208, communication circuitry 210, and, in some embodiments, one or more peripheral devices 212. It should be appreciated that the endpoint computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile (e.g., dynamic random access memory (DRAM), etc.) or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the endpoint computing device 102 via the I/O subsystem 206, which may be embodied as circuitry and/or components to facilitate input/output operations with the processor 202, the memory 204, and other components of the endpoint computing device 102. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the endpoint computing device 102, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the endpoint computing device 102 and other computing devices, as well as any network communication enabling devices, such as an access point, network switch/router, etc., to allow communication over the network 110. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 210 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the endpoint computing device 102, etc.), performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the endpoint computing device 102 (e.g., incorporated on a single integrated circuit chip along with a processor 202, the memory 204, and/or other components of the endpoint computing device 102). Alternatively, in some embodiments, the specialized circuitry, hardware, or combination thereof may be embodied as one or more discrete processing units of the endpoint computing device 102, each of which may be capable of performing one or more of the functions described herein.

The one or more peripheral devices 212 may include any type of device that is usable to input information into the endpoint computing device 102 and/or receive information from the endpoint computing device 102. The peripheral devices 212 may be embodied as any auxiliary device usable to input information into the endpoint computing device 102, such as a keyboard, a mouse, a microphone, a barcode reader, an image scanner, etc., or output information from the endpoint computing device 102, such as a display, a speaker, graphics circuitry, a printer, a projector, etc. It should be appreciated that, in some embodiments, one or more of the peripheral devices 212 may function as both an input device and an output device (e.g., a touchscreen display, a digitizer on top of a display screen, etc.). It should be further appreciated that the types of peripheral devices 212 connected to the endpoint computing device 102 may depend on, for example, the type and/or intended use of the endpoint computing device 102. Additionally or alternatively, in some embodiments, the peripheral devices 212 may include one or more ports, such as a USB port, for example, for connecting external peripheral devices to the endpoint computing device 102.

While not illustratively shown, it should be appreciated that, depending on the embodiment, the endpoint computing device 102 may include one or more sensors and/or actuators. For example, the sensor(s) may be include, but are not limited to, a motion sensor, an image sensor, a position sensor, a temperature sensor, a humidity sensor, a power sensor, an environmental sensor, a building management sensor, a building automation sensor, a radar sensor, a vision sensor, or any other type of sensor.

Figure 3:
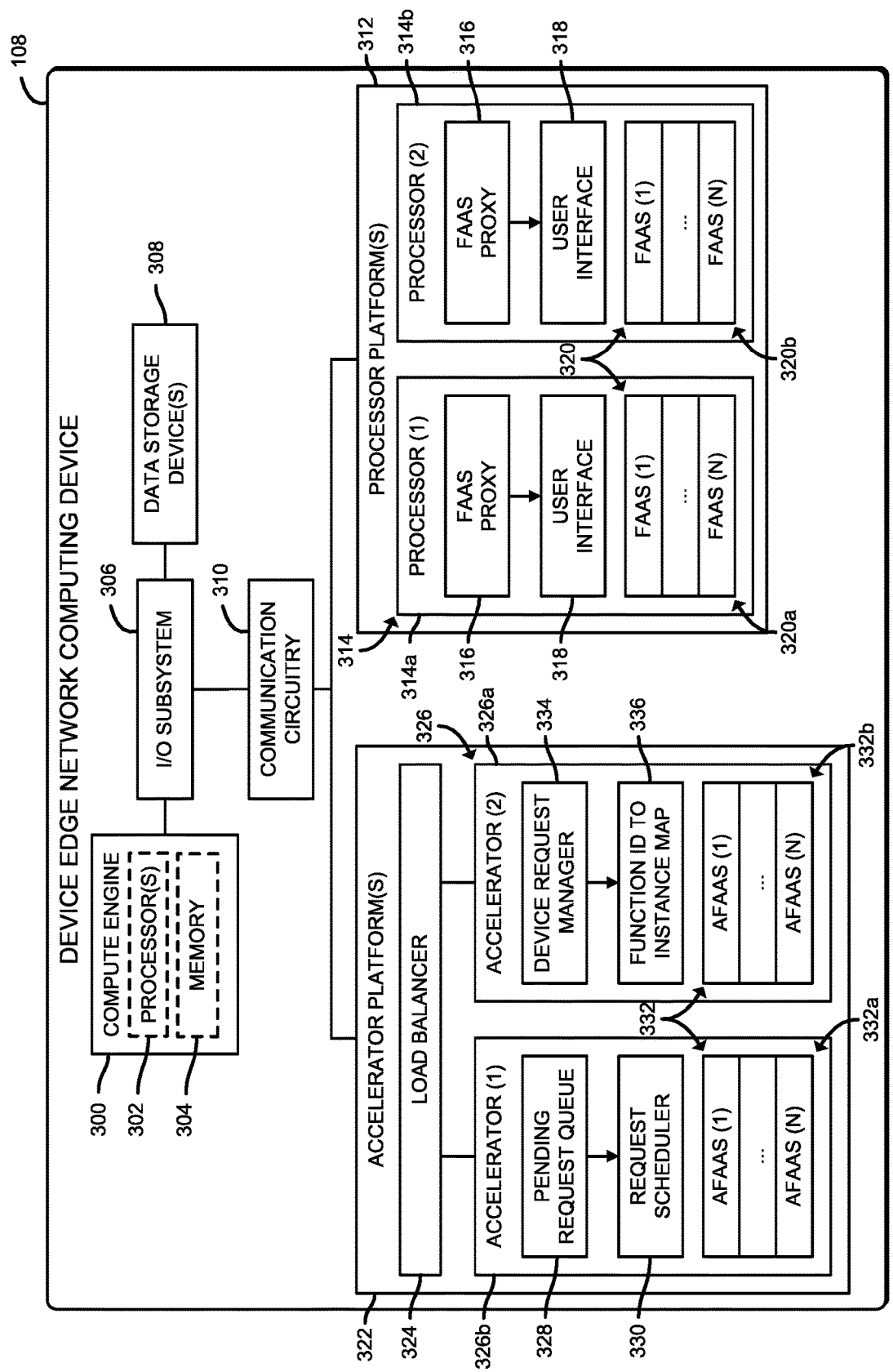
FIG. 3 is a simplified block diagram of at least one embodiment of the device edge computing device of the system of FIG. 1.

Referring now to FIG. 3, the device edge network computing device 104 may be embodied as, without limitation, one or more servers (including, e.g., stand-alone server(s), rack-mounted server(s), blade server(s), etc.), a network appliance (e.g., a multi-access edge computing (MEC) appliance), a distributed computing system, or any other combination of compute/storage device(s) capable of performing the functions described herein. As illustratively shown, the device edge network computing device 104 includes similar and/or like components to those of the illustrative endpoint computing device 102 of FIG. 2, including a compute engine 300 with one or more processors 302 and memory 304, an I/O subsystem 306, one or more data storage devices 308, and communication circuitry 310.

As such, figures and descriptions of the similar/like components are not repeated herein for clarity of the description with the understanding that the description of the corresponding components provided above in regard to the endpoint computing device 102 of FIG. 2 applies equally to the corresponding components of the device edge network computing device 104 of FIG. 3. Of course, it should be appreciated that the respective computing devices may include additional and/or alternative components, depending on the embodiment.

The illustrative device edge network computing device 104 additionally includes one or more accelerated platforms 322 and one or more processor platforms 312 (i.e., non-accelerated platforms). The illustrative processor platform 312 includes one or more processors 314 capable of executing one or more FaaS operations 320. As illustratively shown, the one or more processors 314 includes a first processor, designated as processor (1) 314*a*, and a second processor, designated as processor (N) 314*b* (e.g., in which the processor (N) 314*b* represents the "Nth" processor 314, wherein "N" is a positive integer). Each of the processors 314 includes a FaaS proxy 316 coupled to a user interface 318 usable to expose the required set of FaaS operations of the supported FaaS operations 320 as a function of a received request. As illustratively shown, processor (1) 314*a* includes one set of supported FaaS operations 320*a*, while processor (2) 314*b* includes another set of supported FaaS operations 320*b*. It should be appreciated that each set of FaaS operations 320 may be different from one processor 314 to the next.

As also illustratively shown, the accelerated platform 322 includes a load balancer 324 (i.e., a load balancer interface) communicatively coupled to one or more accelerators 326 (e.g., FGPAs). The illustrative accelerators 326 includes a first accelerator, designated as accelerator (1) 326*a*, and a second accelerator, designated as accelerator (N) 326*b* (e.g., in which the accelerator (N) 326*b* represents the "Nth" accelerator 326, wherein "N" is a positive integer). The accelerators 326 may be embodied as one or more FPGAs, compute processors, graphics processors, ASICs, digital signal processor, specially designed circuitry, and/or any other type of accelerator hardware on which functions can be more efficiently performed than is possible on a more general-purpose processor. The illustrative accelerator 326*a* includes a queue of pending requests 328 coupled to a request scheduler 330 for managing the required AFaaS operations of the supported AFaaS operations 332 as a function of the received requests in the queue of pending requests 328. The illustrative accelerator 326*b* includes a device request manager 334 coupled to a function identifier to instance map 336 and a set of supported AFaaS operations 332.

In some embodiments, the device request manager 334 may configured to process each request to execute a particular accelerated function (e.g., binary and payload). Alternatively, in other embodiments, the device request manager 334 may configured to receive a function identifier, and install and instantiate the function associated with the function identifier in the local platform. As illustratively shown, accelerator (1) 326*a* includes one set of supported AFaaS operations 332*a*, while accelerator (2) 326*b* includes another set of supported AFaaS operations 332*b*. It should be appreciated that each set of AFaaS operations 332 may be different from one accelerator 326 to the next. In some embodiments, the one or more accelerated platforms 322 may be headless (e.g., interfaces exposed by accelerators instead of processors).

Figure 4:
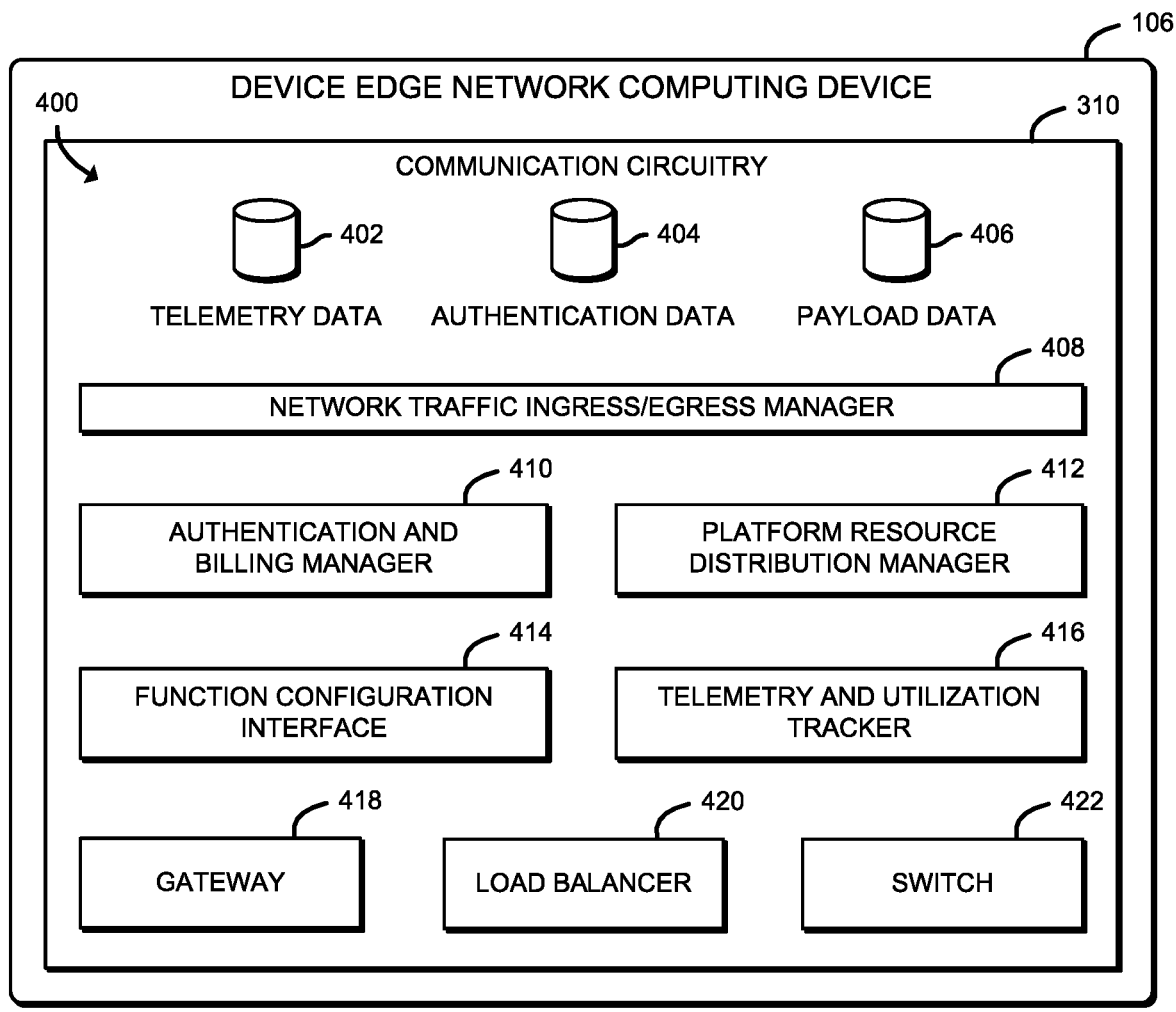
FIG. 4 is a simplified block diagram of at least one embodiment of an environment that may be established by the device edge computing device of FIGS. 1 and 3.

Referring now to FIG. 4, in an illustrative embodiment, the device edge network computing device 104 establishes an environment 400 during operation. The illustrative environment 400 includes a network traffic ingress/egress manager 408, an authentication and billing manager 410, a platform resource distribution manager 412, a function configuration interface 414, a telemetry and utilization tracker 416, a gateway 418, a load balancer 420, and a switch 422. The various components of the environment 400 may be embodied as hardware, firmware, software, or a combination thereof. As such, in some embodiments, one or more of the components of the environment 400 may be embodied as circuitry or collection of electrical devices (e.g., network traffic ingress/egress management circuitry 408, authentication and billing management circuitry 410, platform resource distribution management circuitry 412, function configuration interface circuitry 414, telemetry and utilization tracking circuitry 416, gateway circuitry 418, load balancing circuitry 420, switch circuitry 422, etc.).

It should be appreciated that, in such embodiments, one or more of the network traffic ingress/egress management circuitry 408, the authentication and billing management circuitry 410, the platform resource distribution management circuitry 412, the function configuration interface circuitry 414, the telemetry and utilization tracking circuitry 416, the gateway circuitry 418, the load balancing circuitry 420, and the switch circuitry 422 may form a portion of one or more of the compute engine 300, the I/O subsystem 306, the communication circuitry 310 (as illustratively shown), and/or other components of the device edge network computing device 104. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the compute engine 300 or other components of the device edge network computing device 104. It should be appreciated that the device edge network computing device 104 may include other components, sub-components, modules, sub-modules, logic, sub-logic, and/or devices commonly found in a computing device, which are not illustrated in FIG. 4 for clarity of the description.

In the illustrative environment 400, the device edge network computing device 104 additionally includes telemetry data 402, authentication data 404, and payload data 406, each of which may be accessed by the various components and/or sub-components of the device edge network computing device 104. Additionally, it should be appreciated that in some embodiments the data stored in, or otherwise represented by, each of the telemetry data 402, the authentication data 404, and the payload data 406 may not be mutually exclusive relative to each other. For example, in some implementations, data stored in the telemetry data 402 may also be stored as a portion of one or more of the authentication data 404 and/or the payload data 406. As such, although the various data utilized by the device edge network computing device 104 is described herein as particular discrete data, such data may be combined, aggregated, and/or otherwise form portions of a single or multiple data sets, including duplicative copies, in other embodiments.

The network traffic ingress/egress manager 408, which may be embodied as hardware, firmware, software, virtualized hardware, emulated architecture, and/or a combination thereof as discussed above, is configured to receive inbound and route/transmit outbound network traffic. To do so, the network traffic ingress/egress manager 408 is configured to facilitate inbound/outbound network communications (e.g., network traffic, network packets, network flows, etc.) to and from the device edge network computing device 104. For example, the network traffic ingress/egress manager 408 is configured to manage (e.g., create, modify, delete, etc.) connections to physical and virtual network ports (i.e., virtual network interfaces) of the device edge network computing device 104 (e.g., via the communication circuitry 310), as well as the ingress/egress buffers/queues associated therewith. In some embodiments, the payload of the network communications (e.g., operation requests, collected data, etc.) may be stored in the payload data 406.

The authentication and billing manager 410, which may be embodied as hardware, firmware, software, virtualized hardware, emulated architecture, and/or a combination thereof as discussed above, is configured to authenticate requests received at the device edge network computing device 104 from the endpoint computing device 102. Upon successful authentication, the authentication and billing manager 410 is configured to transmit authentication and billing information to a central billing authority (e.g., a carrier or provider). In some embodiments, the authentication and billing manager 410 may be configured to transmit the authentication and billing information via an out-of-band fabric (i.e., an out-of-band management communication channel). Additionally, the authentication and billing manager 410 may be configured to store the authentication and/or billing related data in the authentication data 404, in some embodiments.

The platform resource distribution manager 412, which may be embodied as hardware, firmware, software, virtualized hardware, emulated architecture, and/or a combination thereof as discussed above, is configured to manage the distribution of the various resources of the platforms (e.g., the non-accelerated processor platforms 312 and accelerated platforms 322 of FIG. 3) of the device edge network computing device 104. For example, the platform resource distribution manager 412 may be configured to expose interfaces (e.g., OpenStack (OOO) project interfaces) to the system software stack (e.g., orchestrators) which are usable to configure and manage the FaaS and AFaaS operations relative to a particular accelerator (e.g., one of the accelerators 326) or processor (e.g., one of the processors 314).

As described previously, the accelerator may be embodied as an FPGA, a compute processor, a graphics processor (e.g., a general purpose graphics processing unit (GPU)), an ASIC, a digital signal processor, a specially designed circuit, and/or any other type of specialized hardware on which functions can be more efficiently performed than is possible on more general-purpose processors (i.e., the processors 314). To manage the distribution of the various resources of the platforms of the device edge network computing device 104, the platform resource distribution manager 412 may determine which interfaces to expose on which platform (i.e., which accelerator 326 or processor 314 of a respective platform 322, 312) as a function of the processing requirements and quality of service (QoS) requirements, such as may be stipulated in a corresponding service level agreement (SLA). Additionally, the platform resource distribution manager 412 may further determine which interfaces to expose based on telemetry and usage information usable to identify available resources of the respective platform, such as may be stored in the telemetry data 402 by the telemetry and utilization tracker 416.

The function configuration interface 414, which may be embodied as hardware, firmware, software, virtualized hardware, emulated architecture, and/or a combination thereof as discussed above, is configured to provide an interface between the FaaS/AFaaS operations (i.e., the supported FaaS operations 320 and the supported AFaaS operations 332 of FIG. 3) and the requests received to perform the associated FaaS/AFaaS operations. As such, the function configuration interface 414 may accept/reject requests based on various information collected by the device edge network computing device 104, such as may be collected by the telemetry and utilization tracker 416. For example, based on telemetry data related to the supported FaaS operations and AFaaS operations, as well as utilization information related to the platform resources of the device edge network computing device 104, a request to a particular type of function that is exposed (i.e., supported) by one or more processors and/or accelerators of the device edge network computing device 104 may be rejected due to those potential processors and accelerators presently processing a high load.

The telemetry and utilization tracker 416, which may be embodied as hardware, firmware, software, virtualized hardware, emulated architecture, and/or a combination thereof as discussed above, is configured to track the execution of the FaaS and AFaaS operations, as well as track the level of utilization of each processor (e.g., the processor 314 of FIG. 3) and accelerator (e.g., the accelerator 326) of the respective platforms. For example, the utilization levels may include any data usable to identify a used and/or available portion of the respective component such as a queue occupancy level, an accelerator compute usage/availability level, a processor compute usage availability level, etc. The telemetry and utilization tracker 416 may be configured, depending on the embodiment, to store the telemetry and utilization information in the telemetry data 402. As such, the telemetry and utilization information can be exposed to the system software stack, as well as additional processing in order to identify and predict potential issues, such as degradation of a particular service due to an amount of requests having been received from the various endpoint computing devices 102. Additionally, the telemetry and utilization tracker 416 may be configured to notify the function configuration interface 414 of load conditions which can result in inbound requests being rejected.

The gateway 418, which may be embodied as hardware, firmware, software, virtualized hardware, emulated architecture, and/or a combination thereof as discussed above, is configured to store received requests (i.e., network packet payloads, descriptions, statuses, header information, etc.) in memory which can be accessed by the processors and accelerators via AILs to fetch the payloads, descriptions, etc., of the received requests upon execution of the appropriate FaaS/AFaaS operation(s). The load balancer 420, which may be embodied as hardware, firmware, software, virtualized hardware, emulated architecture, and/or a combination thereof as discussed above, is configured to accept authenticated requests and determine which processor (e.g., the processor 314 of FIG. 3) or accelerator (e.g., the accelerator 326) will execute the requested FaaS/AFaaS operations thereon. To do so, the load balancer 420 may determine the compute resource based on telemetry and/or utilization information of the device edge network computing device 104, which may be collected by the telemetry and utilization tracker 416.

The switch 422, which may be embodied as hardware, firmware, software, virtualized hardware, emulated architecture, and/or a combination thereof as discussed above, is configured to transmit the received requests to the determined processor (e.g., the processor 314 of FIG. 3) or accelerator (e.g., the accelerator 326), such as may be determined by the load balancer 420. It should be appreciate that, in some embodiments, one or more of the functions described herein as being performed by a particular element may be incorporated into another element. For example, the authentication and billing management functions as described herein as being performed by the authentication and billing manager 410, may be performed by the gateway 418 in other embodiments.

Figure 5A:
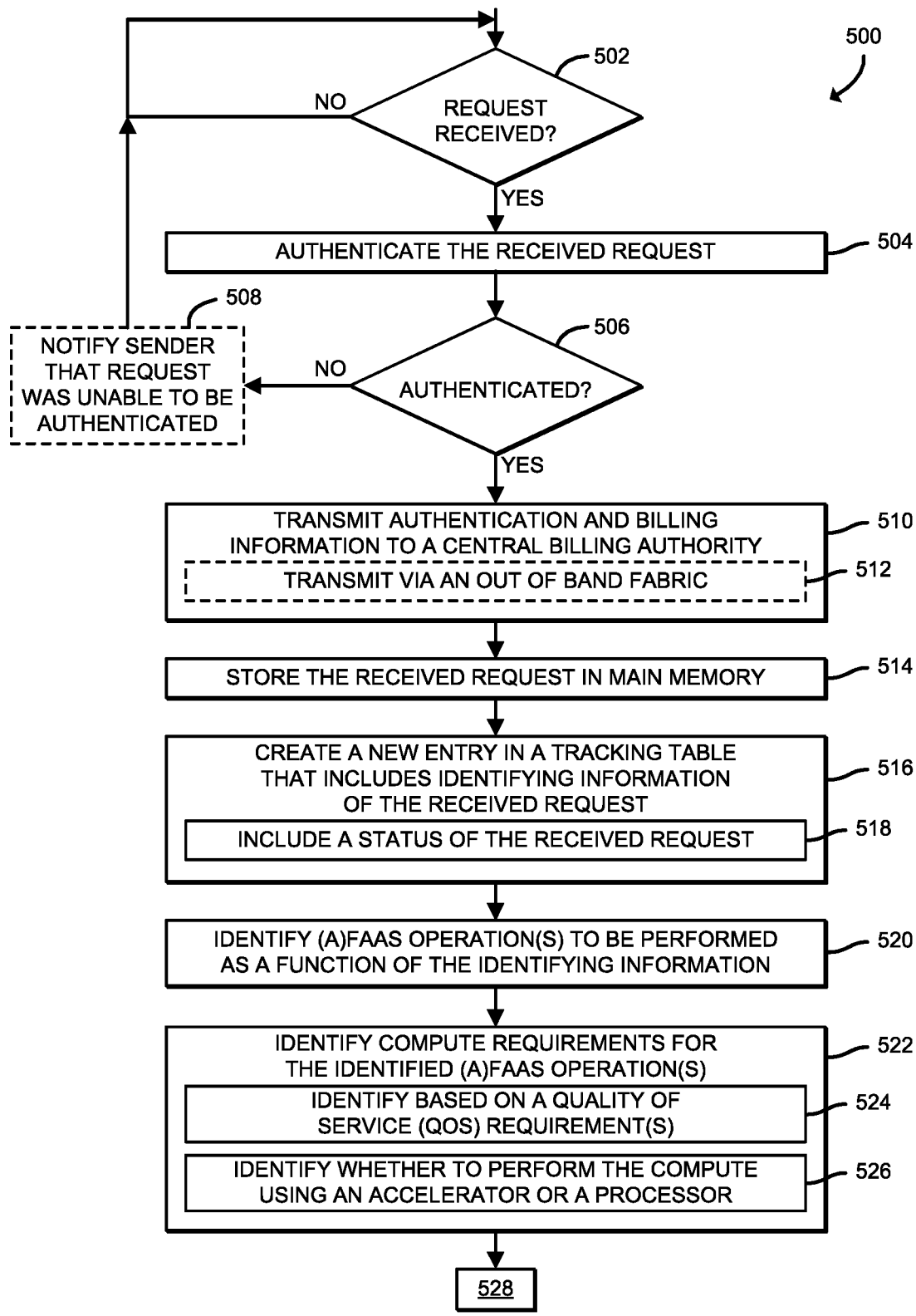
FIGS. 5A and 5B are a simplified flow diagram of at least one embodiment of a method for accelerating edge device workloads that may be executed by the device edge computing device of FIGS. 1, 3, and 4.
Figure 5B:
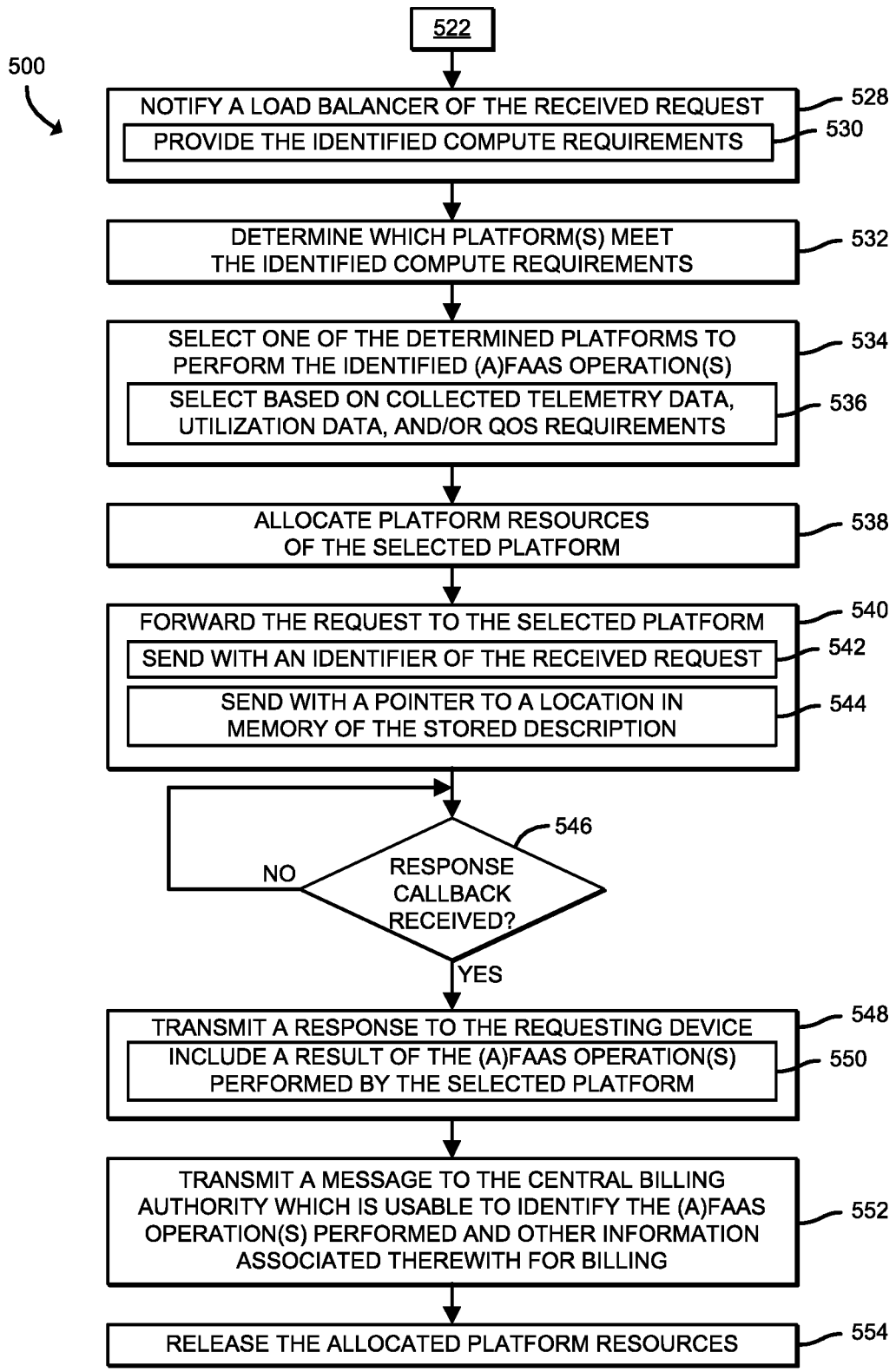

Referring now to FIGS. 5A and 5B, a method 500 for accelerating edge device workloads is shown which may be executed by a device edge network computing device (e.g., the device edge network computing device 104), or more particularly by communication circuitry (e.g., the communication circuitry 310) and one or more compute platforms (e.g., one or more of the accelerated platforms 322 or one or more of the processor platforms 312) of the device edge network computing device. As described previously, the device edge network computing device 104 is located at the device edge of a network (e.g., between the network 110 and the endpoint computing device 102 of FIG. 1), referred to herein as the device edge network 108. As also described previously, the device edge network computing device 104 may be located in a base station (e.g., the illustrative base station 106 of FIG. 1), a small cell, data station, or other carrier/provider device which serves as a gateway between the network 110 and the endpoint computing device 102 of FIG. 1. The method 500 begins with block 502, in which the device edge network computing device 104, or more particularly a gateway (e.g., the gateway 418) of the device edge network computing device 104, determines whether a request to perform one or more compute operations has been received from an endpoint computing device (e.g., the endpoint computing device 102).

If so, the method 500 advances to block 504, in which the gateway authenticates the received request (e.g., via a authentication certificate identifying the requestor usable to validate privileges to access a particular function). It should be appreciated that the received request includes a payload, one or more function identifiers of corresponding a FaaS/AFaaS operation(s) to be performed on at least a portion of the received request (e.g., the payload), one or more parameters (e.g., types of resources required, amounts of resources required, etc.), one or more QoS requirements (e.g., amount of time in which computation is to be performed, resource requirements, etc.), and authentication information. In block 506, the gateway determines whether the received request has been authenticated. If not, in some embodiments, the method 500 branches to block 508 in which the device edge network computing device 104 notifies the endpoint computing device 102 that the request was unable to be authenticated before the method 500 returns to block 502 to determine whether another request has been received. Otherwise, if the gateway determines that the received request has been authenticated, the method 500 advances to block 510.

In block 510, the device edge network computing device 104 transmits authentication and billing information to a central billing authority (e.g., a carrier, provider, etc.). In some embodiments, in block 512, the device edge network computing device 104 may transmit the authentication and billing information via an out-of-band fabric (i.e., an out-of-band communication channel). In block 514, the gateway stores the received request in a range of main memory of the device edge network computing device 104 (e.g., the data storage device 308 of FIG. 3). As described previously, the received request includes a payload, an identifier of a function (i.e., a FaaS/AFaaS operation) to be performed, one or more parameters, one or more QoS requirements, and authentication information, each of which may be stored in the memory location.

In block 516, the device edge network computing device 104 (e.g., the gateway thereof) creates a new entry in a tracking table that includes identifying information of the received request. Additionally, in block 518, the device edge network computing device 104 includes a status (e.g., running, failed, waiting for execution, etc.) of the received request in the tracking table entry. In block 520, the device edge network computing device 104 identifies one or more FaaS or AFaaS operations which are to be performed based on the one or more function identifiers of the FaaS/AFaaS operation(s) to be performed. As noted previously, the one or more function identifiers of the FaaS/AFaaS operation(s) to be performed were received with the request and stored in memory in block 514. As such, in block 520, the device edge network computing device 104 may be additionally configured to perform a fetch operation to retrieve the function identifier(s). It should be appreciated that, in some embodiments, the device edge network computing device 104 may be configured to identify the FaaS/AFaaS operation(s) to be performed on the request. In such embodiments, the device edge network computing device 104 may identify the one or more FaaS or AFaaS operations as a function of additional and/or alternative information, such as a workload type of the received request.

In block 522, the device edge network computing device 104 identifies the compute requirements necessary to perform the identified FaaS/AFaaS operation(s). To do so, in block 524, the device edge network computing device 104 identifies any QoS requirements associated with the received request and identifies the compute requirements as a function of the identified QoS requirements. Additionally, in block 526, the device edge network computing device 104 identifies whether to perform the identified AFaaS/FaaS operation(s) using a processor (e.g., the processor 314 of FIG. 3) or an accelerator (e.g., the accelerator 326). As described previously, the accelerator may be embodied as an FPGA, a compute processor, a graphics processor (e.g., a general purpose GPU), an ASIC, a digital signal processor, a specially designed circuit, and/or any other type of specialized hardware on which functions (i.e., the accelerated functions) can be more efficiently performed than is possible on more general-purpose processors (i.e., the processors 314). In block 528, as shown in FIG. 5B, the device edge network computing device 104, or more particularly the gateway of the device edge network computing device 104, notifies a load balancer (e.g., the load balancer 420 of FIG. 4) of the received request. Additionally, in block 530, the gateway provides the identified compute requirements.

In block 532, the device edge network computing device 104, or more particularly the load balancer of the device edge network computing device 104 determines which platform(s) (i.e., one or more of the accelerated platforms 322 or the processor platforms 312) meet the identified compute requirements. In an illustrative example, the load balancer may determine that the identified compute requirements indicate the operation is to be an accelerated operation corresponding to an AFaaS operation which is only supported on one accelerator of two accelerated platforms (e.g., one of the AFaaS operations 332 supported on two of the accelerated platforms 322). In block 534, the load balancer of the device edge network computing device 104 selects one of the platforms determined in block 532 to perform the identified AFaaS/FaaS operation(s). To do so, in block 536, the load balancer selects the platform based on one or more of collected telemetry data, utilization data, and QoS requirements. Accordingly, it should be appreciated that, under certain conditions, the load balancer may select a processor platform that supports the requested operation, despite an accelerator platform being available, such as may be necessary in order to ensure QoS requirements are met.

In block 538, the device edge network computing device 104 allocates platform resources (e.g., as a function of the identified compute requirements). In block 540, the load balancer forwards the request to the selected compute platform (e.g., via the switch 422 of FIG. 4). Additionally, in block 542, the load balancer sends an identifier of the received request with the forwarded request. Further, in block 544, the load balancer sends a pointer to a location in memory of the stored description of the received request with the forwarded request. In block 546, the device edge network computing device 104 determines whether a response callback has been received from the compute platform indicating the AFaaS/FaaS operation(s) have completed. If so, the method 500 advances to block 548.

In block 548, the device edge network computing device 104 transmits a response to the requesting endpoint computing device 102 from which the request was received. Additionally, in block 550, the device edge network computing device 104 includes a result of the AFaaS/FaaS operation(s) performed by the selected platform. In block 552, the device edge network computing device 104 transmits a message to the central billing authority which is usable to identify the AFaaS/FaaS operation(s) performed by the device edge network computing device 104 and other information associated therewith (e.g., duration of processing time, compute information, etc.) which may be used to determine an amount to bill for performing the AFaaS/FaaS operation(s). In block 554, the device edge network computing device 104 releases the allocated platform resources.

It should be appreciated that, in some embodiments, at least a portion of the request and or a result of the AFaaS/FaaS operation(s) performed by the device edge network computing device 104 may be further transmitted to a data center, cloud, or other remote compute/storage provider for further computation and/or storage.

EXAMPLES

Illustrative examples of the technologies disclosed herein are provided below. An embodiment of the technologies may include any one or more, and any combination of, the examples described below.

Example 1 includes a network computing device for accelerating edge device workloads, the network computing device comprising a compute engine; one or more accelerated platforms including at least one accelerator which supports a plurality of accelerated FaaS (AFaaS) operations; one or more processor platforms including at least one processor which supports a plurality of non-accelerated FaaS operations; and communication circuitry to receive, by a gateway of the communication circuitry at a device edge network, a request from an endpoint computing device to perform a function-as-a-service (FaaS) at the network computing device; determine, by the gateway, whether the received request indicates that one of the plurality of AFaaS operations is to be performed on at least a portion of the received request; identify, by the gateway and in response to a determination that the received request indicates that a AFaaS operation of the plurality of AFaaS operations is to be performed, compute requirements for the identified AFaaS operation; select, by the gateway, an accelerator platform of one or more accelerated platforms to perform the identified AFaaS operation; forward, by a switch of the communication circuitry, the received request to the selected accelerator platform; and transmit, by the gateway in response to having received an indication that the identified AFaaS operation has completed, a response to the endpoint computing device that includes a result of the identified AFaaS operation.

Example 2 includes the subject matter of Example 1, and wherein to select the accelerator platform to perform the identified AFaaS operation comprises to transmit, by the gateway, to a load balancer of the communication circuitry, a notification that the received request is ready to be processed, wherein the notification includes the identified compute requirements and an identifier of the identified AFaaS operation; determine, by the load balancer, one or more of the one or more accelerated platforms to perform the identified AFaaS operation as a function of the identified compute requirements; and select, by the load balancer, the accelerator platform of the one or more of the one or more accelerated platforms to perform the identified AFaaS operation.

Example 3 includes the subject matter of any of Examples 1 and 2, and wherein the communication circuitry is further to determine, by the gateway, whether the received request indicates that one of the non-accelerated FaaS operations is to be performed on at least a portion of the received request; identify, by the gateway and in response to a determination that the received request indicates that a non-accelerated FaaS operation of the plurality of the non-accelerated FaaS operations is to be performed, compute requirements for the non-accelerated FaaS operation; select, by the gateway, a processor platform of the one or more processor platforms to perform the identified non-accelerated FaaS operation; forward, by the switch, the received request to the selected non-accelerated platform; and transmit, by the gateway in response to having received an indication that the identified non-accelerated operation has completed, a response to the endpoint computing device that includes a result of the identified non-accelerated operation.

Example 4 includes the subject matter of any of Examples 1-3, and wherein to select the processor platform of the one or more processor platforms to perform the identified non-accelerated FaaS operation comprises to transmit, by the gateway, to a load balancer of the communication circuitry, a notification that the received request is ready to be processed, wherein the notification includes the identified compute requirements; determine, by the load balancer, one or more of the one or more processor platforms as a function of the identified compute requirements; and select, by the load balancer, the processor platform of the one or more processor platforms to perform the identified non-accelerated FaaS operation.

Example 5 includes the subject matter of any of Examples 1-4, and wherein to identify the compute requirements for the non-accelerated FaaS operation comprises to identify the compute requirements as a function of one or more quality of service (QoS) requirements.

Example 6 includes the subject matter of any of Examples 1-5, and wherein the communication circuitry is further to authenticate, by the gateway, the received request; and transmit, in response to a determination that the received request has been successfully authenticated, authentication and billing information to a central billing authority.

Example 7 includes the subject matter of any of Examples 1-6, and wherein to determine whether the received request indicates that the one of the plurality of AFaaS operations is to be performed comprises to determine based on a function identifier included with the received request.

Example 8 includes the subject matter of any of Examples 1-7, and wherein the communication circuitry is further to create an entry in a tracking table, wherein the entry corresponds to the received message, and wherein the entry includes identifying information of the received request and a status of the received request.

Example 9 includes the subject matter of any of Examples 1-8, and wherein to identify the compute requirements for the identified AFaaS operation comprises to identify the compute requirements as a function of one or more quality of service (QoS) requirements.

Example 10 includes the subject matter of any of Examples 1-9, and wherein the communication circuitry is further to store at least a portion of the received request in a main memory of the network computing device, and wherein to forward the received request to the selected accelerated platform comprises to forward the received request with a point to a location in the main memory at which the at least a portion of the received request has been stored.

Example 11 includes one or more machine-readable storage media comprising a plurality of instructions stored thereon that, in response to being executed, cause a network computing device to receive, by a gateway of the network computing device at a device edge network, a request from an endpoint computing device to perform a function-as-a-service (FaaS) operation at the network computing device, wherein the FaaS operation comprises (i) one of a plurality of non-accelerated FaaS operations supported by at least one processor of a processor-based platform or (ii) one of a plurality of accelerated FaaS (AFaaS) operations supported by at least one accelerator of an accelerator-based platform; determine, by the gateway, whether the received request indicates that one of the plurality of AFaaS operations is to be performed on at least a portion of the received request; identify, by the gateway and in response to a determination that the received request indicates that a AFaaS operation of the plurality of AFaaS operations is to be performed, compute requirements for the identified AFaaS operation; select, by the gateway, an accelerator platform of one or more accelerated platforms to perform the identified AFaaS operation; forward, by a switch of the communication circuitry, the received request to the selected accelerator platform; and transmit, by the gateway in response to having received an indication that the identified AFaaS operation has completed, a response to the endpoint computing device that includes a result of the identified AFaaS operation.

Example 12 includes the subject matter of Example 11, and wherein to select the accelerator platform to perform the identified AFaaS operation comprises to transmit, by the gateway, to a load balancer of the communication circuitry, a notification that the received request is ready to be processed, wherein the notification includes the identified compute requirements and an identifier of the identified AFaaS operation; determine, by the load balancer, one or more of the one or more accelerated platforms to perform the identified AFaaS operation as a function of the identified compute requirements; and select, by the load balancer, the accelerator platform of the one or more of the one or more accelerated platforms to perform the identified AFaaS operation.

Example 13 includes the subject matter of any of Examples 11 and 12, and wherein the plurality of instructions further cause the network computing device to determine, by the gateway, whether the received request indicates that one of the non-accelerated FaaS operations is to be performed on at least a portion of the received request; identify, by the gateway and in response to a determination that the received request indicates that a non-accelerated FaaS operation of the plurality of the non-accelerated FaaS operations is to be performed, compute requirements for the non-accelerated FaaS operation; select, by the gateway, a processor platform of the one or more processor platforms to perform the identified non-accelerated FaaS operation; forward, by the switch, the received request to the selected non-accelerated platform; and transmit, by the gateway in response to having received an indication that the identified non-accelerated operation has completed, a response to the endpoint computing device that includes a result of the identified non-accelerated operation.

Example 14 includes the subject matter of any of Examples 11-13, and wherein to select the processor platform of the one or more processor platforms to perform the identified non-accelerated FaaS operation comprises to transmit, by the gateway, to a load balancer of the communication circuitry, a notification that the received request is ready to be processed, wherein the notification includes the identified compute requirements; determine, by the load balancer, one or more of the one or more processor platforms as a function of the identified compute requirements; and select, by the load balancer, the processor platform of the one or more processor platforms to perform the identified non-accelerated FaaS operation.

Example 15 includes the subject matter of any of Examples 11-14, and wherein to identify the compute requirements for the non-accelerated FaaS operation comprises to identify the compute requirements as a function of one or more quality of service (QoS) requirements.

Example 16 includes the subject matter of any of Examples 11-15, and wherein the plurality of instructions further cause the network computing device to authenticate, by the gateway, the received request; and transmit, in response to a determination that the received request has been successfully authenticated, authentication and billing information to a central billing authority.

Example 17 includes the subject matter of any of Examples 11-16, and wherein to determine whether the received request indicates that the one of the plurality of AFaaS operations is to be performed comprises to determine based on a function identifier included with the received request.

Example 18 includes the subject matter of any of Examples 11-17, and wherein the plurality of instructions further cause the network computing device to create an entry in a tracking table, wherein the entry corresponds to the received message, and wherein the entry includes identifying information of the received request and a status of the received request.

Example 19 includes the subject matter of any of Examples 11-18, and wherein to identify the compute requirements for the identified AFaaS operation comprises to identify the compute requirements as a function of one or more quality of service (QoS) requirements.

Example 20 includes the subject matter of any of Examples 11-19, and wherein the plurality of instructions further cause the network computing device to store at least a portion of the received request in a main memory of the network computing device, and wherein to forward the received request to the selected accelerated platform comprises to forward the received request with a point to a location in the main memory at which the at least a portion of the received request has been stored.

Example 21 includes a network computing device for accelerating edge device workloads, the network computing device comprising circuitry for receiving, at a device edge network, a request from an endpoint computing device to perform a function-as-a-service (FaaS) operation at the network computing device, wherein the FaaS operation comprises (i) one of a plurality of non-accelerated FaaS operations supported by at least one processor of a processor-based platform or (ii) one of a plurality of accelerated FaaS (AFaaS) operations supported by at least one accelerator of an accelerator-based platform; means for determining whether the received request indicates that one of the plurality of AFaaS operations is to be performed on at least a portion of the received request; means for identifying, in response to a determination that the received request indicates that a AFaaS operation of the plurality of AFaaS operations is to be performed, compute requirements for the identified AFaaS operation; means for selecting an accelerator platform of one or more accelerated platforms to perform the identified AFaaS operation; means for forwarding the received request to the selected accelerator platform; and circuitry for transmitting, in response to having received an indication that the identified AFaaS operation has completed, a response to the endpoint computing device that includes a result of the identified AFaaS operation.

Example 22 includes the subject matter of Example 21, and further including means for determining whether the received request indicates that one of the non-accelerated FaaS operations is to be performed on at least a portion of the received request; means for identifying, in response to a determination that the received request indicates that a non-accelerated FaaS operation of the plurality of the non-accelerated FaaS operations is to be performed, compute requirements for the non-accelerated FaaS operation; means for selecting a processor platform of the one or more processor platforms to perform the identified non-accelerated FaaS operation as a function of the identified compute requirements; means for forwarding the received request to the selected non-accelerated platform; and circuitry for transmitting, in response to having received an indication that the identified non-accelerated operation has completed, a response to the endpoint computing device that includes a result of the identified non-accelerated operation.

Example 23 includes the subject matter of any of Examples 21 and 22, and wherein the means for identifying the compute requirements for the non-accelerated FaaS operation comprises means for identifying the compute requirements as a function of one or more quality of service (QoS) requirements.

Example 24 includes the subject matter of any of Examples 21-23, and further including means for authenticating the received request; and circuitry for transmitting, in response to a determination that the received request has been successfully authenticated, authentication and billing information to a central billing authority.

Example 25 includes the subject matter of any of Examples 21-24, and further including means for storing at least a portion of the received request in a main memory of the network computing device, and wherein the means for forwarding the received request to the selected accelerated platform comprises means for forwarding the received request with a point to a location in the main memory at which the at least a portion of the received request has been stored.

The invention claimed is:

1. A network computing device for accelerating edge device workloads, the network computing device comprising:
   a compute engine;
   a processor platform including at least one processor that supports a plurality of non-accelerated function-as-a-service (FaaS) operations;
   an accelerated platform including an accelerator that supports a plurality of accelerated FaaS operations; and
   communication circuitry to:
      identify an accelerated FaaS operation that is to be performed on at least a portion of a request received from an endpoint computing device;
      identify compute requirements for the identified accelerated FaaS operation;
      select, based on the identified compute requirements, a platform to process the request from either the processor platform or the accelerated platform;
      forward the received request to the selected platform; and
      transmit, in response to a determination that the identified accelerated FaaS operation has completed, a response to the endpoint computing device that includes a result of the identified accelerated FaaS operation.

2. The network computing device of claim 1, wherein to select the platform to process the request includes the communication circuitry to:
   select, based on the identified compute requirements, the processor platform; and
   forward the received request to the processor platform.

3. The network computing device of claim 1, wherein to select the platform to process the request includes the communication circuitry to:
   select, based on the identified compute requirements, the accelerated platform; and
   forward the received request to the accelerated platform.

4. The network computing device of claim 1, wherein to select the platform to process the request includes the communication circuitry to:
   transmit, by a gateway of the communication circuitry and to a load balancer of the communication circuitry, a notification that the received request is ready to be processed, wherein the notification includes the identified compute requirements and an identifier of the identified accelerated FaaS operation; and
   select, by the load balancer, the accelerator platform to perform the identified accelerated FaaS operation.

5. The network computing device of claim 1, wherein the communication circuitry is further to:
   identify a non-accelerated FaaS operation that is to be performed on at least a portion of the request;
   identify compute requirements for the identified non-accelerated FaaS operation;
   select, based on the identified compute requirements for the identified non-accelerated FaaS operation, a platform to process the identified non-accelerated FaaS operation from either the processor platform or the accelerated platform;
   forward the received request to the selected platform to process the non-accelerated FaaS operation; and
   transmit, in response to a determination that the identified non-accelerated FaaS operation has completed, a response to the endpoint computing device that includes a result of the identified non-accelerated FaaS operation.

6. The network computing device of claim 5, wherein to select the platform to process the request includes the communication circuitry to:
   transmit, by a gateway of the communication circuitry and to a load balancer of the communication circuitry, a notification that the received request is ready to be processed, wherein the notification includes the identified compute requirements and an identifier of the identified non-accelerated FaaS operation; and
   select, by the load balancer, the processor platform to perform the identified non-accelerated FaaS operation.

7. The network computing device of claim 1, wherein the communication circuitry is further to:
   authenticate the received request; and
   transmit, in response to a determination that the received request has been successfully authenticated, authentication and billing information to a central billing authority.

8. The network computing device of claim 1, wherein the communication circuitry is further to create an entry in a tracking table, wherein the entry corresponds to the received request, and wherein the entry includes identifying information of the received request and a status of the received request.

9. The network computing device of claim 1, wherein to identify the compute requirements for the identified accelerated FaaS operation includes the communication circuitry to identify the compute requirements as a function of one or more quality of service (QoS) requirements.

10. The network computing device of claim 1, wherein the communication circuitry is further to store at least a portion of the received request in a main memory of the network computing device, and wherein to forward the received request to the selected platform includes to forward the received request with a point to a location in the main memory at which the at least a portion of the received request has been stored.

11. One or more machine-readable storage media comprising a plurality of instructions stored thereon that, when executed, cause a network computing device to:
   identify an accelerated function-as-a-service (FaaS) operation that is to be performed on at least a portion of a request received from an endpoint computing device;
   identify compute requirements for the identified accelerated FaaS operation;
   select, based on the identified compute requirements, a platform to process the request from either (i) a processor platform of the network computing device that includes at least one processor that supports a plurality of non-accelerated FaaS operations or (ii) an accelerated platform of the network computing device that includes an accelerator that supports a plurality of accelerated FaaS operations;
   forward the received request to the selected platform; and
   transmit, in response to a determination that the identified accelerated FaaS operation has completed, a response to the endpoint computing device that includes a result of the identified accelerated FaaS operation.

12. The one or more machine-readable storage media of claim 11, wherein the plurality of instructions, when executed, cause the network computing device to:
   select, based on the identified compute requirements, the processor platform; and
   forward the received request to the processor platform.

13. The one or more machine-readable storage media of claim 11, wherein the plurality of instructions, when executed, cause the network computing device to:
   select, based on the identified compute requirements, the accelerated platform; and
   forward the received request to the accelerated platform.

14. The one or more machine-readable storage media of claim 11, wherein the plurality of instructions, when executed, cause the network computing device to:
   transmit, by a gateway of a communication circuitry of the network computing device and to a load balancer of the communication circuitry, a notification that the received request is ready to be processed, wherein the notification includes the identified compute requirements and an identifier of the identified accelerated FaaS operation; and
   select, by the load balancer, the accelerator platform to perform the identified accelerated FaaS operation.

15. The one or more machine-readable storage media of claim 11, wherein the plurality of instructions, when executed, further cause the network computing device to:
   identify a non-accelerated FaaS operation that is to be performed on at least a portion of the request;
   identify compute requirements for the identified non-accelerated FaaS operation;
   select, based on the identified compute requirements for the identified non-accelerated FaaS operation, a platform to process the identified non-accelerated FaaS operation from either the processor platform or the accelerated platform;
   forward the received request to the selected platform to process the non-accelerated FaaS operation; and
   transmit, in response to a determination that the identified non-accelerated FaaS operation has completed, a response to the endpoint computing device that includes a result of the identified non-accelerated FaaS operation.

16. The one or more machine-readable storage media of claim 15, wherein the plurality of instructions, when executed, cause the network computing device to:
   transmit, by a gateway of the communication circuitry and to a load balancer of the communication circuitry, a notification that the received request is ready to be processed, wherein the notification includes the identified compute requirements and an identifier of the identified non-accelerated FaaS operation; and
   select, by the load balancer, the processor platform to perform the identified non-accelerated FaaS operation.

17. The one or more machine-readable storage media of claim 11, wherein the plurality of instructions, when executed, further cause the network computing device to:
   authenticate the received request; and
   transmit, in response to a determination that the received request has been successfully authenticated, authentication and billing information to a central billing authority.

18. The one or more machine-readable storage media of claim 11, wherein the plurality of instructions, when executed, further cause the network computing device to create an entry in a tracking table, wherein the entry corresponds to the received request, and wherein the entry includes identifying information of the received request and a status of the received request.

19. The one or more machine-readable storage media of claim 11, wherein the plurality of instructions, when executed, cause the network computing device to identify the compute requirements as a function of one or more quality of service (QoS) requirements.

20. The one or more machine-readable storage media of claim 11, wherein the plurality of instructions, when executed, further cause the network computing device to store at least a portion of the received request in a main memory of the network computing device, and wherein to forward the received request to the selected platform includes to forward the received request with a point to a location in the main memory at which the at least a portion of the received request has been stored.

* * * * *